United States Patent [19]
Boyle et al.

[11] Patent Number: 5,630,994
[45] Date of Patent: May 20, 1997

[54] NON-AQUEOUS SOLUTION PREPARATION OF DOPED AND UNDOPED LIXMNYOZ

[76] Inventors: Timothy J. Boyle, 5801 Eubank, N.E., Apt. #97, Albuquerque, N.M. 87111; James A. Voigt, 187 Aaramar La., Corrales, N.M. 87048

[21] Appl. No.: 510,082

[22] Filed: Aug. 1, 1995

[51] Int. Cl.$^6$ ................................................. C01G 45/12
[52] U.S. Cl. ........................ 423/594; 423/597; 423/600
[58] Field of Search .................... 423/594, 599, 423/600, 265

[56] References Cited

U.S. PATENT DOCUMENTS

| | | | |
|---|---|---|---|
| 4,567,031 | 1/1986 | Riley | 423/599 |
| 5,370,948 | 12/1994 | Hasegawa et al. | 423/594 |
| 5,413,974 | 5/1995 | Yokoyama et al. | 423/600 |
| 5,474,752 | 12/1995 | Yamamoto | 423/594 |

OTHER PUBLICATIONS

Tarascon, J.M., Wang, E., Shokoohi, F.K.,. McKinnon, W. R and Colson, S., *The Spinel Phase of LiMn$_2$O$_4$ as a Cathode in Secondary Lithium Cells*, J. Electrochem. Soc., vol. 138, No. 10, Oct. 1991.

Rani, Durga, Prasad, P.S.S., Kotheim, T. A. And J. McBreen, *Electrochemical Performance of Manganese Oxide Cathode in Secondary Lithium Batteries –Influence of Second Transitional Metal Oxide*, ECS Fall Meeting 1992 –Battery Division –Oct. 11 –16, 1992, Toronto Canada.

Bito, Y., Murai, H., Ito S., Hasegawa, M. And Toyoguchi, Y., *A study on LiM$_x$Mn$_{z-x}$O$_4$ (M=Co, Ni, Al, Ti) as Positive Electrode Materials for Lithium Seconary Batteries*, Energy Research Laboratory, Matsushita Electric Industrial Co., Ltd., Moriguchi, Osaka, 570 Japan (no date).

*Primary Examiner*—Ngoc-Yen Nguyen
*Attorney, Agent, or Firm*—Gregory A. Cone; Timothy D. Stanley

[57] ABSTRACT

A method for generation of phase-pure doped and undoped $Li_xMn_yO_z$ precursors. The method of this invention uses organic solutions instead of aqueous solutions or nonsolution ball milling of dry powders to produce phase-pure precursors. These precursors can be used as cathodes for lithium-polymer electrolyte batteries. Dopants may be homogeneously incorporated to alter the characteristics of the powder.

21 Claims, 1 Drawing Sheet

NON-AQUEOUS SOLUTION PREPARATION OF DOPED AND UNDOPED $Li_xMn_yO_z$

The United States Government has rights in this invention pursuant to Contract No. DE-AC04-76DP00789 between the Department of Energy and American Telephone and Telegraph Company.

BACKGROUND OF THE INVENTION

Field of the Invention

A method for the consistent generation of phase-pure, doped and undoped $Li_xMn_yO_z$ to be used, for example, in the manufacture of cathodes for lithium batteries has been actively sought. Standard preparation methods for these compounds use the mixed-oxide approach of heat treating a mixture of lithium and manganese salts or oxides (e.g., $LiOH+MnO_2$; $Li_2CO_3+MnO_2$; $Li_2CO_3+Mn_2O_3$) to form the desired lithium manganese oxide phase. This invention uses organic solutions instead of aqueous solutions or non-solution ball milling of dry powders to produce phase-pure $Li_xMn_yO_z$.

BACKGROUND ART

U.S. Pat. No. 5,135,732 (Barboux et al.) discloses the preparation of $LiMn_2O_4$ compounds with aqueous solutions.

SUMMARY OF THE INVENTION

An object of this invention is a process for producing phase-pure, doped and undoped $Li_xMn_yO_z$ which can be used, for example, in the manufacture of cathodes for lithium batteries.

Another object of this invention is the preparation of $Li_xMn_yO_z$ using organic solvents instead of aqueous solutions or non-solution ball milling of dry powders.

A still further object of this invention is the formation of homogeneous solutions of lithium-manganese nitrates which can be precipitated as intimately mixed powders of lithium-manganese oxalates.

A still further object of this invention is the formation of homogeneous solutions of lithium-manganese doped nitrates which can be precipitated as intimately mixed powders of lithium-manganese doped oxalates.

A still further object of this invention is the controlled stoichiometric formation of $Li_xMn_yO_z$ compounds not feasible with current technology.

A still further object of this invention is the controlled introduction of transition metal dopants into $Li_xMn_yO_z$ compounds to control the characteristics of battery-cathode material made from these compounds.

To achieve the foregoing and other objects, and in accordance with the purpose of the present invention, as embodied and broadly described herein, the present invention is a method of preparing $Li_xMn_yO_z$ powder compounds using organic solutions instead of the currently used aqueous solutions or non-solution ball milling of dry powders. The method of the present invention readily produces phase-pure material which is being investigated for the manufacture of cathodes for lithium polymer electrolyte batteries. The intimate mixing produced by this chemical methodology results in powder compounds which have short component diffusion distances; therefore, significantly lower temperatures can be used to convert the compounds to desired mixed-oxide form. The method allows for controlled stoichiometric formation and doping of $Li_xMn_yO_z$ compounds which is not feasible with current technology. The controlled introduction of dopants to control the final characteristics of battery cathode material made from these compounds is easily realized.

BRIEF DESCRIPTION OF THE DRAWING

The accompanying drawing, which is incorporated in, and forms part of, the specification, illustrates embodiments of this invention and, together with the description, serve to explain the principles of the invention.

DESCRIPTION OF THE PREFERRED EMBODIMENTS

Figure 1:
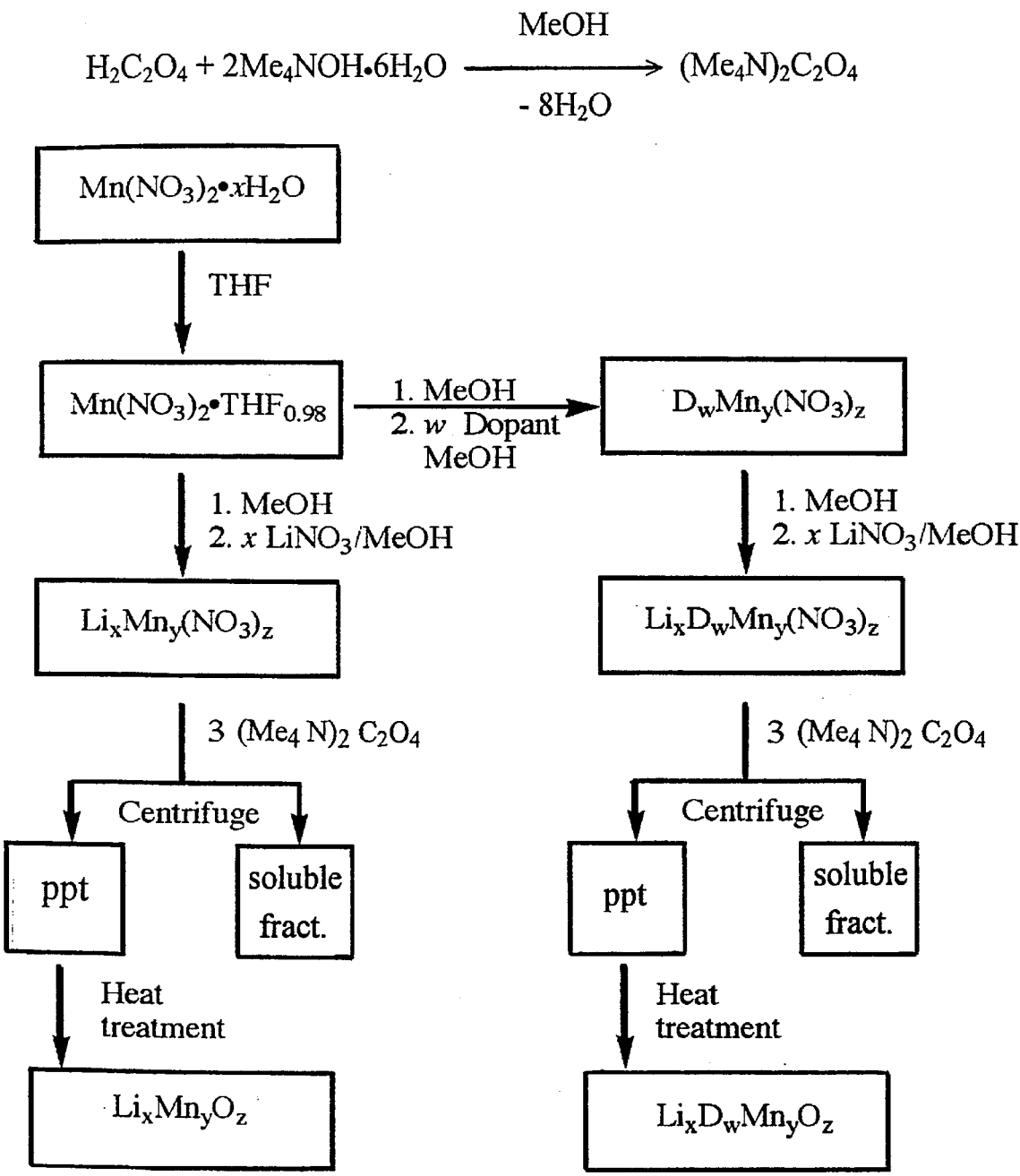
FIG. 1 shows the general steps for the production of doped and undoped $Li_xMn_yO_z$ compounds according to this invention.

According to a preferred embodiment of this invention, a system is provided for the generation of phase-pure, doped and undoped $Li_xMn_yO_z$ compounds to be used, for example, in the manufacture of cathodes in lithium batteries in a reproducible way.

As shown in FIG. 1, a preferred embodiment of this invention includes the preparation of precursors using organic solvents. The following example is provided as illustrative of the present invention and is not intended to limit its scope in any way:

Example

All reactions were handled under an inert atmosphere unless otherwise noted. Tetrahydrofuran (THF) and methanol were dried over, and distilled from, Na/benzophenone and CaO, respectively. All Fourier transform infrared (FT-IR) data were collected on pre-fired material. Aldrich $Me_4NOH \cdot 6H_2O$ (tetramethyl ammonium hydroxide hexahydrate), $H_2C_2O_4$ (oxalic acid), Aldrich $Mn(NO_3)_2 \cdot xH_2O$, Aldrich $LiNO_3$, Aldrich $Al(NO_3)_3 \cdot 9H_2O$, Aldrich $Ni(NO_3)_2 \cdot 6H_2O$ and Aldrich $Co(NO_3)_2 \cdot 6H_2O$ were used as received. The values for molar solutions and volume ratios are approximate.

$(Me_4N)_2C_2O_4$: A 6.0M solution of $Me_4NOH \cdot 6H_2O$ in methanol was added to a stirring 8.3M solution of $H_2C_2O_4$ in methanol in the volume ratio of 1.0:0.36, respectively. The reactants were stirred under argon for 24 hours. The solvent was removed in vacuo over a period of 12 hours using a warm water bath. The resulting white powder was used without further purification.

$Mn(NO_3)_2 \cdot THF_{0.98}$: A 3.4M solution of $Mn(NO_3)_2 \cdot xH_2O$ in THF was stirred for 12 hours and the solvent removed in vacuo over a period of 12 hours. The degree of substitution was proven by weight differential to be 1 $Mn(NO_3)_2$:0.98 THF molecules.

$LiMn_2O_4$: A 0.87M solution of $LiNO_3$ in methanol was added to a stirring 0.42M solution of $Mn(NO_3)_2 \cdot THF_{0.98}$ in methanol in the volume ratio of 1.0:4.4, respectively. This mixture was stirred for 10 min and one volume unit of a 0.29M solution of $(Me_4N)_2C_2O_4$ in methanol was added by syringe to 0.26 volume unit of the mixture. A precipitate immediately formed. The resulting powder was separated from the solution by centrifugation and dried by rotary evaporation. This air-sensitive off-white powder was then placed in a ceramic boat and rapidly transferred, in air, to a furnace. The powder was fired at 0.2° C./min up to 200° C. and then heated at 5° C./min up to 600° C. and held at this temperature for 3 hours to facilitate crystallization. The resulting material has been shown by x-ray diffraction (XRD) to be phase-pure $LiMn_2O_4$: Fourier transform infrared (FT-IR) (KBr, cm$^{-1}$) 3038 (w), 2966(w), 2587(w), 2485(w), 2383(w), 1676(m), 1630(mb), 1496(s), 1348(sb), 1266(m), 1095(m), 1046(w), 1019(m), 950(s), 833(w), 821 (wb), 797(m), 497(w), 460(w), 408(w).

$Li_2Mn_2O_4$: A method similar to the production of $LiMn_2O_4$ was used except for the following change: 1.7M solution of $LiNO_3$ in methanol.

$Li_3Mn_2O_4$: A method similar to the production of $LiMn_2O_4$ was used except for the following change: 2.6M solution of $LiNO_3$ in methanol.

$AlLi_8Mn_{15}O_{32}$: A 0.17M solution of $Al(NO_3)_3 \cdot 9H_2O$ in methanol was added to a 1.3M solution of $Mn(NO_3)_2 \cdot THF_{0.98}$ in methanol in the volume ratio of 1.0:4.4, respectively. 0.054 mole of $LiNO_3$ was added to this stirring solution. This mixture was stirred for 10 min. and one volume unit of a 1.9M solution of $(Me_4N)_2C_2O_4$ in methanol was added to 0.26 volume unit of the mixture. A precipitate immediately formed. The resulting powder was separated from the solution by centrifugation and dried by rotary evaporation. This air-sensitive, off-white powder was then placed in a ceramic boat and rapidly transferred, in air, to a furnace. The powder was fired at 0.2° C./min up to 200° C. and then heated at 5° C./min up to 600° C. and held at this temperature for 3 hours to facilitate crystallization. The resulting material was shown by XRD to be a phase-pure $AlLi_8Mn_{15}O_{32}$: FT-IR (KBr, cm$^{-1}$) 3040(m), 2969(w), 2365 (m), 2346(m), 1693(sb), 1631(sb), 1492(s), 1337(sb), 1044 (w), 1023(w), 948(s), 920(wb), 833(m), 791(m), 669(w), 580(w), 495(m), 460(m), 418(w).

$DLi_8Mn_{15}O_{32}$ (D=dopant): A method similar to the production of $AlLi_8Mn_{15}O_{32}$ was used except for the substitution of: (a) a 0.17M solution of $Co(NO_3)_2 \cdot 6H_2O$ in methanol for the 0.17M solution of $Al(NO_3)_3 \cdot 9H_2O$ in methanol: FT-IR (KBr, cm$^{-1}$) 3040(w), 2973(w), 2937(w), 2380(w), 1622(sb), 1494(s), 1347(sb), 1047(w), 949(m), 922(w), 831 (w), 789(m), 744(w), 497(w), 459(w); (b) a 0.17M solution of $Ni(NO_3)_2 \cdot 6H_2O$ in methanol for the 0.17M solution of $Al(NO_3)_3 \cdot 9H_2O$ in methanol: FT-1R (KBr, cm$^{-1}$) 3031(w), 2962(w), 2361(m), 2346(w), 1629(sb), 1497(s), 1350(sb), 1047(w), 1030(w), 1018(m), 948(s), 921(w), 833(w), 820 (w), 798(m), 741(w), 669(w), 497(w), 459(w), 419(w).

$D_2Li_8Mn_{14}O_{32}$: A method similar to the production of $AlLi_8Mn_{15}O_{32}$ was used except for the substitution of: (a) a 0.36M solution of $Al(NO_3)_3 \cdot 9H_2O$ in methanol for the 0.17M solution of $Al(NO_3)_3 \cdot 9H_2O$ in methanol: FT-IR (KBr, cm$^{-1}$) 3042(m), 2972(w), 2934(wb), 2382(m), 1653(sb), 1624(sb), 1494(s), 1348(sb), 1045(w), 1020(w), 950(s), 921 (m), 833(m), 791(s), 705(w), 581(m), 493(s), 460(wb), 421(w); (b) a 0.37M solution of $Co(NO_3)_2 \cdot 6H_2O$ in methanol for the 0.17M solution of $Al(NO_3)_3 \cdot 9H_2O$ in methanol: FT-IR (KBr, cm$^{-1}$) 3039(m), 2972(w), 2925(w), 2380(w), 1632(sb), 1497(s), 1347(sb), 1047(w), 1019(w), 948(s), 922 (wb) 833(w), 798(m), 496(w), 460(w), 421(w); (c) a 0.37M solution of $Ni(NO_3)_2 \cdot 6H_2O$ in methanol for the 0.17M solution of $Al(NO_3)_3 \cdot 9H_2O$ in methanol: FT-IR CKbr, cm$^{-1}$) 3037(w), 2968(w), 2922(w), 2364(w), 2335(w), 1634(mb), 1470(s), 1343(sb), 1024(w), 955(m), 832(w), 788(m), 745 (w), 668(w), 494(w), 459(w), 420(w).

$D_3Li_8Mn_{13}O_{32}$: A method similar to the production of $AlLi_8Mn_{15}O_{32}$ was used except for the substitution of: (a) a 0.54M solution of $Al(NO_3)_3 \cdot 9H_2O$ in methanol for the 0.17M solution of $Al(NO_3)_3 \cdot 9H_2O$ in methanol: FT-IR (KBr, cm$^{-1}$) 3038(m), 2972(w), 2380(wb), 2052(w), 1692(sb), 1627(sb), 1496(s), 1346(sb), 1046(w), 1021(m), 949(s), 917(m), 831(m), 794(s), 585(m), 492(s), 460(m), 416(w);

(b) a 0.54M solution of $Co(NO_3)_2 \cdot 6H_2O$ in methanol for the 0.17M solution of $Al(NO_3)_3 \cdot 9H_2O$ in methanol: FT-IR (KBr, cm$^{-1}$) 3037(w), 2973(w), 2363(w), 2342(w), 1678(m), 1636 (s), 1502(s), 1344(sb), 1048(w), 1019(w), 949(s), 921(w), 833(w), 796(m), 669(w), 496(w), 459(w); (c) a 0.54M solution of $Ni(NO_3)_2 \cdot 6H_2O$ in methanol for the 0.17M solution of $Al(NO_3)_3 \cdot 9H_2O$ in methanol: FT-IR (KBr, cm$^{-1}$) 3038(w), 2970(w), 2373(w), 1675(mb), 1628(mb), 1495(s), 1342(sb), 1045(w), 1018(w), 949(m), 921(w), 831(w), 750 (m), 670(w), 459(w), 415(w).

The example discussed above is cited to illustrate a particular embodiment of this invention. It is contemplated that the use of the invention may involve components having different forms and compositions. For example, $Li_xMn_yO_z$ precursor compounds may be made with or without dopants. It is intended that the scope of the invention be defined by the claims appended hereto.

What is claimed is:

1. A method comprising preparing phase-pure $LiMn_2O_4$ comprising the steps of:

(a) preparing an approximately 3.4M solution of $Mn(NO_3)_2 \cdot xH_2O$ in tetrahydrofuran (THF) and stirring the solution thereby substituting the $H_2O$ with THF to form $Mn(NO_3)_2 \cdot xTHF$;

(b) removing all the unreacted THF solvent in vacuo leaving substantially pure $Mn(NO_3)_2 \cdot THF_{0.98}$;

(c) mixing an approximately 0.87M solution of $LiNO_3$ in an organic solvent with an approximately 0.40M solution of the $Mn(NO_3)_2 \cdot THF_{0.98}$ in said organic solvent, in the volume ratio of about 1.0:4.4, respectively;

(d) mixing an approximately 6.0M solution of $Me_4NOH \cdot 6H_2O$ in said organic solvent with an approximately 8.3M solution of $H_2C_2O_4$ in said organic solvent, in the volume ratio of about 1.0:0.36 respectively, while stirring under an inert gas and then removing the solvent in vacuo to form $(Me_4N)_2C_2O_4$ powder;

(e) mixing an approximately 0.29M solution of said $(Me_4N)_2C_2O_4$ in said organic solvent with the mixed $LiNO_3/Mn(NO_3)_2 \cdot THF_{0.98}$ organic-solvent solutions in the volume ratio of about 1.0 part of the $(Me_4N)_2C_2O_4$ solution to about 0.26 part of the mixed $LiNO_3/Mn(NO_3)_2 \cdot THF_{0.98}$ solutions, respectively, to form a precipitate;

(f) separating the precipitate from solution and processing the precipitate by drying and heating to facilitate crystallization of $LiMn_2O_4$.

2. A method comprising preparing phase-pure $Li_2Mn_2O_4$ comprising the steps of:

(a) preparing an approximately 3.4M solution of/Mn $(NO_3)_2 \cdot xH_2O$ in tetrahydrofuran (THF) and stirring the solution thereby substituting the $H_2O$ with THF to form $Mn(NO_3)_2 \cdot xTHF$;

(b) removing all the unreacted THF solvent in vacuo leaving substantially pure $Mn(NO_3)_2 \cdot THF_{0.98}$;

(c) mixing an approximately 1.7M solution of $LiNO_3$ in an organic solvent with an approximately 0.40M solution of the $Mn(NO_3)_2 \cdot THF_{0.98}$ in said organic solvent, in the volume ratio of about 1.0:4.4, respectively;

(d) mixing an approximately 6.0M solution of $Me_4NOH \cdot 6H_2O$ in said organic solvent with an approximately 8.3M solution of $H_2C_2O_4$ in said organic solvent, in the volume ratio of about 1.0:0.36 respectively, while stirring under an inert gas and then removing the solvent in vacuo to form $(Me_4N)_2C_2O_4$ powder;

(e) mixing an approximately 0.29M solution of said $(Me_4N)_2C_2O_4$ in said organic solvent with the mixed $LiNO_3/Mn(NO_3)_2 \cdot THF_{0.98}$ organic-solvent solutions in the volume ratio of about 1.0 part of the $(Me_4N)_2C_2O_4$ solution to about 0.26 part of the mixed $LiNO_3/Mn(NO_3)_2 \cdot THF_{0.98}$ solution, respectively, to form a precipitate;

(f) separating the precipitate from solution and processing the precipitate by drying and heating to facilitate crystallization of $Li_2Mn_2O_4$.

3. A method comprising preparing phase-pure $Li_3Mn_2O_4$, comprising the steps of:

(a) preparing an approximately 3.4M solution of $Mn(NO_3)_2 \cdot xH_2O$ in tetrahydrofuran (THF) and stirring the solution thereby substituting the $H_2O$ with THF to form $Mn(NO_3)_2 \cdot xTHF$;

(b) removing all the unreacted THF solvent in vacuo leaving substantially pure $Mn(NO_3)_2 \cdot THF_{0.98}$;

(c) mixing an approximately 2.6M solution of $LiNO_3$ in an organic solvent with an approximately 0.40M solution of the $Mn(NO_3)_2 \cdot THF_{0.98}$ in said organic solvent, in the volume ratio of about 1.0:4.4, respectively;

(d) mixing an approximately 6.0M solution of $Me_4NOH \cdot 6H_2O$ in said organic solvent with an approximately 8.3M solution of $H_2C_2O_4$ in said organic solvent, in the volume ratio of about 1.0:0.36 respectively, while stirring under an inert gas and then removing the solvent in vacuo to form $(Me_4N)_2C_2O_4$ powder;

(e) mixing an approximately 0.29M solution of said $(Me_4N)_2C_2O_4$ in said organic solvent with the mixed $LiNO_3/Mn(NO_3)_2 \cdot THF_{0.98}$ organic-solvent solutions in the volume ratio of about 1.0 part of the $(Me_4N)_2C_2O_4$ solution to about 0.26 part of the mixed $LiNO_3/Mn(NO_3)_2 \cdot THF_{0.98}$ solution, respectively, to form a precipitate;

(f) separating the precipitate from solution and processing the precipitate by drying and heating to facilitate crystallization of $Li_3Mn_2O_4$.

4. A method comprising preparing phase-pure $DLi_8Mn_{15}O_{32}$, where D is selected from the group consisting of $Al^{+3}$, $Co^{+2}$, $Ni^{+2}$, and combinations thereof, comprising the steps of:

(a) preparing an approximately 3.4M solution of $Mn(NO_3)_2 \cdot xH_2O$ in tetrahydrofuran (THF) and stirring the solution for about 12 h thereby substituting the $H_2O$ with THF to form $Mn(NO_3)_2 \cdot xTHF$;

(b) removing all the unreacted THF solvent in vacuo leaving substantially pure $Mn(NO_3)_2 \cdot THF_{0.98}$;

(c) mixing an approximately 0.17M solution of $D(NO_3)_n \cdot 3nH_2O$, where n is 2 or 3, in an organic solvent with an approximately 1.3M solution of the $Mn(NO_3)_2 \cdot THF_{0.98}$ in said organic solvent, in the volume ratio of about 1.0:4.4, respectively, and adding approximately 0.054 mole of $LiNO_3$ to the stirring solutions;

(d) mixing an approximately 6.0M solution of $Me_4NOH \cdot 6H_2O$ in said organic solvent with an approximately 8.3M solution of $H_2C_2O_4$ in said organic solvent, in the volume ratio of about 1.0:0.36 respectively, while stirring under an inert gas and then removing the solvent in vacuo to form $(Me_4N)_2C_2O_4$ powder;

(e) mixing an approximately 1.9M solution of said $(Me_4N)_2C_2O_4$ in said organic solvent with the mixed $D(NO_3)_n \cdot 3nH_2O/Mn(NO_3)_2 \cdot TH_{0.98}$ organic-solvent solutions in the volume ratio of about 1.0 part of the $(Me_4N)_2C_2O_4$ solution to about 0.26 part of the mixed $D(NO_3)_n \cdot 3nH_2O/MnCNO_3)_2 \cdot THF_{0.98}$ solutions, respectively, to form a precipitate;

(f) separating the precipitate from solution and processing the precipitate by drying and heating to facilitate crystallization of $DLi_8Mn_{15}O_{32}$.

5. The method of claim 4 wherein D is Al and n is 3.

6. The method of claim 4 wherein D is Co and n is 2.

7. The method of claim 4 wherein D is Ni and n is 2.

8. A method comprising preparing phase-pure $D_2Li_8Mn_{15}O_{32}$, where D is selected from the group consisting of $Al^{+3}$, $Co^{+2}$, $Ni^{+2}$, and combinations thereof, comprising the steps of:

(a) preparing an approximately 3.4M solution of $Mn(NO_3)_2 \cdot xH_2O$ in tetrahydrofuran (THF) and stirring the solution for about 12 h thereby substituting the $H_2O$ with THF to form $Mn(NO_3)_2 \cdot THF$;

(b) removing all the unreacted THF solvent in vacuo leaving substantially pure $Mn(NO_3)_2 \cdot xTHF$;

(c) mixing an approximately 0.36M solution of $D(NO_3)_n \cdot 3nH_2O$, where n is 2 or 3, in an organic solvent with an approximately 1.3M solution of the $Mn(NO_3)_2 \cdot THF_{0.98}$ in said organic solvent, in the volume ratio of about 1.0:4.4, respectively, and adding approximately 0.054 mole of $LiNO_3$ to the stirring solutions;

(d) mixing an approximately 6.0M solution of $Me_4NOH \cdot 6H_2O$ in said organic solvent with an approximately 8.3M solution of $H_2C_2O_4$ in said organic solvent, in the volume ratio of about 1.0:0.36 respectively, while stirring under an inert gas and then removing the solvent in vacuo to form $(Me_4N)_2C_2O_4$ powder;

(e) mixing an approximately 1.9M solution of said $(Me_4N)_2C_2O_4$ in said organic solvent with the mixed $D(NO_3)_n \cdot 3H_2O/Mn(NO_3)_2 \cdot THF_{0.98}$ organic-solvent solutions in the volume ratio of about 1.0 part of the $(Me_4N)_2C_2O_4$ solution to about 0.26 part of the mixed $D(NO_3)_n 3n \cdot H_2O/Mn(NO_3)_2 \cdot THF_{0.98}$ solutions, respectively, to form a precipitate;

(f) separating the precipitate from solution and processing the precipitate by drying and heating to facilitate crystallization of $D_2Li_8Mn_{15}O_{32}$.

9. The method of claim 8 wherein D is Al and n is 3.

10. The method of claim 8 wherein D is Co and n is 2.

11. The method of claim 8 wherein D is Ni and n is 2.

12. A method comprising preparing phase-pure $D_3Li_8Mn_{15}O_{32}$, where D is selected from the group consisting of $Al^{+3}$, $Co^{+2}$, $Ni^{+2}$, and combinations thereof, comprising the steps of:

(a) preparing an approximately 3.4M solution of $Mn(NO_3)_2 \cdot xH_2O$ in tetrahydrofuran (THF) and stirring the solution for about 12 h thereby substituting the $H_2O$ with THF to form $Mn(NO_3)_2 \cdot xTHF$;

(b) removing all the unreacted THF solvent in vacuo leaving substantially pure $Mn(NO_3)_2 \cdot THF_{0.98}$;

(c) mixing an approximately 0.54M solution of $D(NO_3)_n \cdot 3nH_2O$, where n is 2 or 3, in an organic solvent with an approximately 1.3M solution of the $Mn(NO_3)_2 \cdot THF_{0.98}$ in said organic solvent, in the volume ratio of about 1.0:4.4, respectively, and adding approximately 0.054 mole of $LiNO_3$ to the stirring solutions;

(d) mixing an approximately 6.0M solution of $Me_4NOH \cdot 6H_2O$ in said organic solvent with an approximately 8.3M solution $H_2C_2O_4$ in said organic solvent, in the volume 12 ratio of about 1.0:0.36 respectively, while stirring under an inert gas and then removing the solvent in vacuo to form $(Me_4N)_2C_2O_4$ powder;

(e) mixing an approximately 1.9M solution of said $(Me_4N)_2C_2O_4$ in said organic solvent with the mixed $D(NO_3)_n \cdot 3nH_2O/Mn(NO_3)_2 \cdot THF_{0.98}$ organic-solvent solutions in the volume ratio of about 1.0 part of the $(Me_4N)_2C_2O_4$ solution to about 0.26 part of the mixed $D(NO_3)_n \cdot 3nH_2OMn(NO_3)_2 \cdot THF_{0.98}$ solutions, respectively, to form a precipitate;

(f) separating the precipitate from solution and processing the precipitate by drying and heating to facilitate crystallization of $D_3Li_8Mn_{15}O_{32}$.

13. The method of claim 12 wherein D is At and n is 3.

14. The method of claim 12 wherein D is Co and n is 2.

15. The method of claim 12 wherein D is Ni and n is 2.

16. The method of claim 1 wherein the organic solvent is methanol.

17. The method of claim 2 wherein the organic solvent is methanol.

18. The method of claim 3 wherein the organic solvent is methanol.

19. The method of claim 4 wherein the organic solvent is methanol.

20. The method of claim 8 wherein the organic solvent is methanol.

21. The method of claim 12 wherein the organic solvent is methanol.

* * * * *